(12) United States Patent
Chen

(10) Patent No.: US 10,201,213 B1
(45) Date of Patent: Feb. 12, 2019

(54) SEATBELT BUCKLE COVER

(71) Applicant: GM GLOBAL TECHNOLOGY OPERATIONS LLC, Detroit, MI (US)

(72) Inventor: Carter Chen, Shanghai (CN)

(*) Notice: Subject to any disclaimer, the term of this patent is extended or adjusted under 35 U.S.C. 154(b) by 28 days.

(21) Appl. No.: 15/653,751

(22) Filed: Jul. 19, 2017

(51) Int. Cl.
  *A44B 11/00* (2006.01)
  *A44B 11/25* (2006.01)
  *B60R 22/18* (2006.01)
  *B60R 22/12* (2006.01)

(52) U.S. Cl.
  CPC .......... *A44B 11/2546* (2013.01); *A44B 11/00* (2013.01); *B60R 22/12* (2013.01); *B60R 2022/1806* (2013.01)

(58) Field of Classification Search
  CPC ................ A44B 11/2546; A44B 11/00; B60R 2022/1806
  See application file for complete search history.

(56) References Cited

U.S. PATENT DOCUMENTS

| | | | | |
|---|---|---|---|---|
| 3,566,455 A * | 3/1971 | Kuszynski | .......... | A44B 11/2511 24/633 |
| 4,675,954 A * | 6/1987 | Gullickson | ........ | A44B 11/2576 24/579.11 |
| 4,901,407 A * | 2/1990 | Pandola | ............. | A44B 11/2576 24/442 |
| 4,939,824 A * | 7/1990 | Reed | .................. | A44B 11/2576 24/579.11 |
| 5,442,840 A * | 8/1995 | Ewald | ................ | A44B 11/2576 24/579.11 |
| 5,617,617 A * | 4/1997 | Gustin | ............... | A44B 11/2576 24/579.11 |
| 6,138,331 A * | 10/2000 | Powers | .............. | A44B 11/2576 24/306 |
| 6,769,157 B1 * | 8/2004 | Meal | .................. | A44B 11/2576 220/284 |
| 9,439,479 B1 * | 9/2016 | Vu | ..................... | A44B 11/2576 |

* cited by examiner

*Primary Examiner* — Faye M Fleming

(57) ABSTRACT

A cover device adapted to removably cover a portion of a seatbelt buckle is presented herein. The cover device being constructed of a flexible material, the cover device includes a first closed end, slot, and second open end. The slot is formed along a portion of the first closed end and is adapted to allow the passage of a seatbelt tongue as well as resist the passage of other objects or fluids. The second open end is adapted to receive a seatbelt buckle housing.

18 Claims, 4 Drawing Sheets

SEATBELT BUCKLE COVER

INTRODUCTION

Seatbelt buckle mechanisms include openings which may accidentally receive and allow entrance of objects, debris, and liquids other than a seatbelt tongue. Once these foreign objects, debris, and liquids get into the buckle, they tend to jam the buckle's latching mechanism and can block the seatbelt tongue from sufficient buckle entrance. Thus the buckle will require proper cleaning and foreign object removal before it can again properly operate and connect with the seatbelt tongue. Accordingly, it is desirable to allow entrance of the seatbelt tongue into the seatbelt buckle while sealing the buckle opening to resist the passage of foreign objects and/or fluids.

SUMMARY

A cover device adapted to removably cover a portion of a seatbelt buckle is presented herein. The cover device being constructed of a flexible material, the cover device includes a first closed end, slot, and second open end. The slot is formed along a portion of the first closed end and is adapted to allow the passage of a seatbelt tongue as well as resist the passage of other objects or fluids. The second open end is adapted to receive a seatbelt buckle housing.

In one or more embodiments, the cover device further includes a plurality of walls located between the first closed end and second open end; moreover, each wall is configured to cover a portion of a corresponding section of the seatbelt buckle housing. In certain embodiments, the first closed end may include a first flange and a second flange being in an overlapping relationship to define the slot; moreover, the first and second flanges may each be adapted to bend during the passage of the seatbelt tongue so as to create a temporary gap which substantially conforms to the seatbelt tongue periphery. In certain embodiments, the slot may be formed along a tapered portion of the first closed end. In such embodiments, the tapered portion is adapted to guide the seatbelt tongue to pass through the slot. The cover device may be constructed in a substantially rectangular configuration. The cover device may be adapted to sealably cover the seatbelt-tongue-reception end and side wall sections of the seatbelt buckle housing. The flexible material may be rubber. Or the flexible material may be a lightweight plastic or thermoplastic elastomer. Or the flexible material may be phosphorescent.

A cover device adapted to removably seal a seatbelt-tongue-reception end of a seatbelt buckle housing is also presented herein. The cover device is constructed of a flexible material and has a substantially rectangular construction. The cover device includes a first closed end, second open end, and a plurality of walls. The first closed end itself includes a first flange and a second flange that are in an overlapping relationship to define a sealable slot; moreover, the first and second flanges are each adapted to bend during the passage of a seatbelt tongue so as to create a temporary gap which substantially conforms to the seatbelt tongue periphery shape and abuts the seatbelt tongue sides. The first closed end also includes a tapered portion adapted to guide the seatbelt tongue to pass through the sealable slot. The second open end is adapted to receive a seatbelt buckle housing. The walls are located between the first closed end and second open end; moreover, each wall is configured to cover a portion of a corresponding section of the seatbelt buckle housing.

In certain embodiments, the flexible material may be light weight plastic. Or the flexible material may be a thermoplastic elastomer. Or the flexible material may be phosphorescent.

A method of applying a cover device to removably seal the seatbelt-tongue-reception end of a seatbelt buckle housing is further presented herein. The method includes the steps of: providing a seatbelt buckle having a housing with a seatbelt-tongue-reception end; providing a cover device (including: a first closed end; a slot formed along a portion of the first closed end, the slot adapted to allow the passage of a seatbelt tongue and resist the passage of other objects or fluids; and a second open end adapted to receive a seatbelt buckle housing); sliding the cover device over the seatbelt buckle housing such that the second open end receives the seatbelt buckle housing; and allowing the slot to functionally align with a seatbelt-tongue-reception opening through a portion of the seatbelt buckle housing.

In one or more embodiments, the method may further include the step of allowing a seatbelt tongue to pass through the slot so as to enter the seatbelt-tongue-reception opening. In one or more embodiments, the cover device further includes a plurality of walls located between the first closed end and second open end; moreover, each wall is configured to cover a portion of a corresponding section of the seatbelt buckle housing. The cover device may be adapted to fully cover the first end and side walls of the seatbelt buckle housing. In certain embodiments, the first closed end may include a first flange and a second flange being in an overlapping relationship to define the slot; moreover, the first and second flanges may each be adapted to bend during the passage of the seatbelt tongue so as to create a temporary gap which substantially conforms to the seatbelt tongue periphery. In certain embodiments, the slot may be formed along a tapered portion of the first closed end. In such embodiments, the tapered portion is adapted to guide the seatbelt tongue to pass through the slot. The cover device may be constructed in a substantially rectangular configuration. The flexible material may be lightweight plastic.

The above features and advantages and other features and advantages of the present teachings are readily apparent from the following detailed description for carrying out the teachings when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
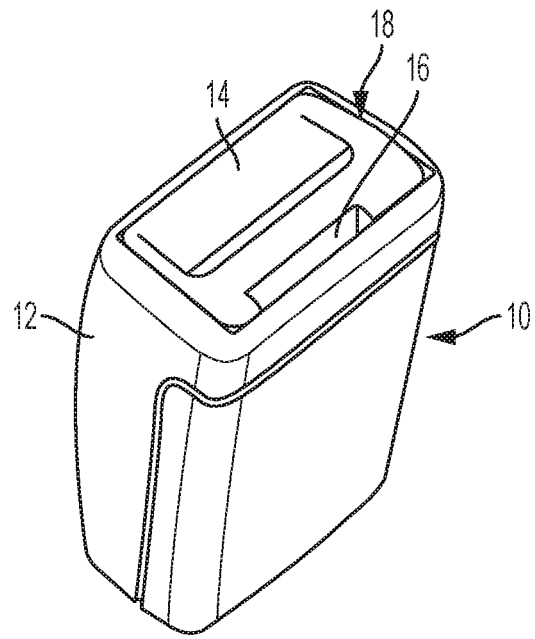
FIG. 1 is a perspective view of a seatbelt buckle.
Figure 5A:
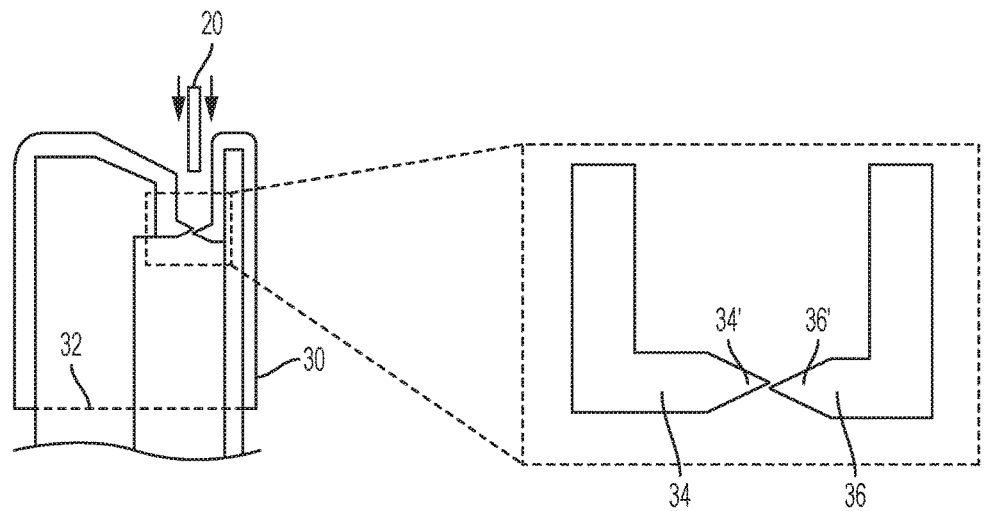
FIG. 5A represents the cutaway view of the cover device of FIG. 3 with emphasis on one or more aspects of the present disclosure.
Figure 5B:
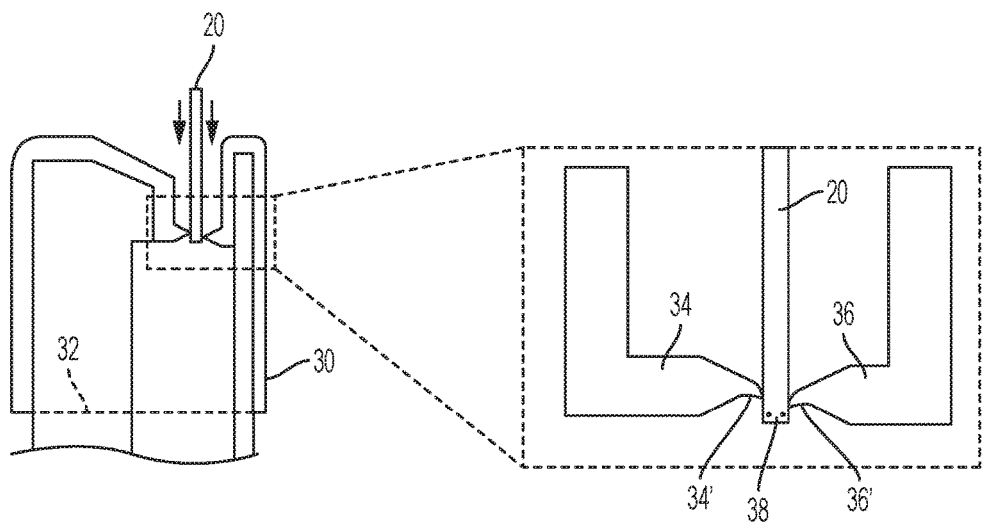
FIG. 5B represents the cutaway view of the cover device of FIG. 3 with emphasis on one or more additional aspects of the present disclosure.

As shown in FIG. 1, an exemplary seat belt buckle 10 includes housing 12 that houses the internal componentry of a buckle latching mechanism 14. Housing 12 can be formed from any suitable material such as, but not limited to, plastic by a process such as injection molding. Housing 34 has a wide mouthed and tapered seatbelt-tongue-reception opening 16, located at the seatbelt-tongue-reception end 18 of buckle 10, which goes through housing 12 at one end thereof and is shaped to easily receive seat belt tongue 20 (FIGS. 5A and 5B).

A disadvantage to buckle 10 is that seatbelt-tongue-reception opening 16 may accidentally receive and allow entrance of foreign objects and debris such as, but not limited to, coins, jewelry, dust, food, insects and/or the opening may receive liquids such as, but not limited to, water and soft drinks. Receipt of these foreign objects, debris, and liquids tends to jam the componentry of the buckle latching mechanism 14. Moreover, these foreign objects can block the tongue 20 from properly entering housing 12 and creating an operational relationship with latching mechanism 14. Regardless, either situation can create a substantial risk of buckle malfunction which could produce danger to the vehicle operator/passenger attempting to properly use their respective seatbelt system. The buckle 10 therefore would require cleaning to remove these foreign objects/liquids as well as allow latching mechanism 14 to properly operate and connect with tongue 20 to reduce the risk of buckle malfunction. The cover device, discussed below, removably covers a portion of buckle 10 to resist the passage of such foreign objects and/or fluids through opening 16 without any structural changes being required for buckle 10.

Figure 2:
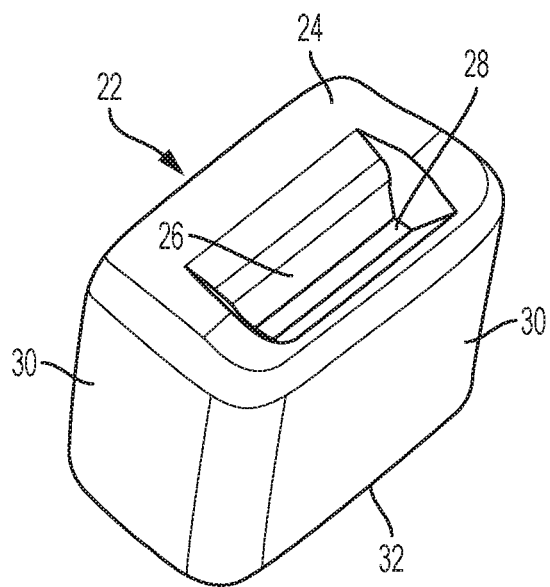
FIG. 2 is a perspective view of a seatbelt buckle cover device according to an aspect of the present disclosure.
Figure 3:
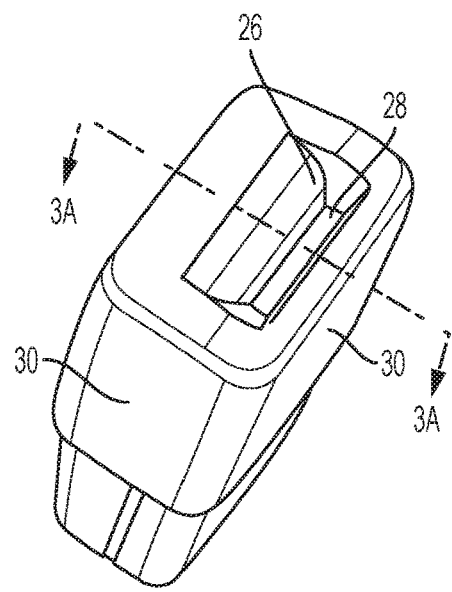
FIG. 3 is a perspective view of the cover device of FIG. 2 according to another aspect of the present disclosure.
Figure 3A:
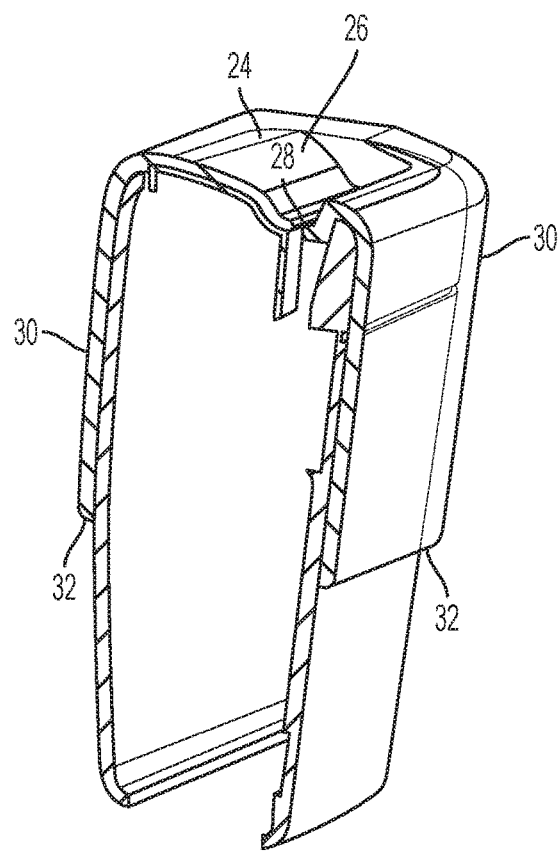
FIG. 3A is a cutaway view of the cover device of FIG. 3 according to line 3A-3A of FIG. 3.

Referring to FIGS. 2 through 3A, the cover device, specifically designed to removably seal the seatbelt-tongue-reception end 18 of buckle 10, has generally been indicated by reference numeral 22. As can be seen, cover device 22 composes a generally rectangular shape. Device 22 is moreover constructed of a flexible material formed to fit around the rectangular housing 12 of buckle 10 (for example, one previously assembled and installed onto a vehicle seat or within a vehicle interior). As follows, cover device 22 may be manufactured from materials such as, but not limited to, rubber or lightweight plastic, or some combination thereof (for example—thermoplastic elastomer (TPE)), by an injection molding process configured to form the material to a design which would shape the device to fit snugly around housing 12. Moreover, to ensure material flexibility, cover device 22 may be of a sufficiently thin construction, for example, having an average width of approximately two millimeters (2 mm). Cover device 22 thus acts as a sealant and skin for housing 12 and adds little volume around buckle 10. It is envisioned that the material which manufactures device 22 may incorporate dye compositions which would provide device 22 to have a colorful, aesthetically pleasing, and/or easily viewed look; for example, the material may have a bright red color to make device 22 pleasing to look at as well as easy to find within the vehicle interior.

A first closed end 24 is located on the upper side of device 22 (oriented when covering the typically situated buckle 10 extending from a vehicle seat, for instance). Running lengthwise along first end 24 is a tapered portion 26 that helps a seatbelt user target and guide the seatbelt tongue 20 to properly pass through a sealable slot 28 (discussed below). Slot 28 is located at the bottom of a channel formed by the angular sides of the tapered portion 26. Similar to one aspect discussed above, the materials which manufacture device 22 may incorporate dye compositions that are phosphorescent in nature (i.e., glow-in-the-dark dye compositions). As a result, targeting and guiding tongue 20 towards slot 28 may be made easier in a poorly lit/dim/dark environment through the glow-in-the-dark nature of device 22.

Figure 4:
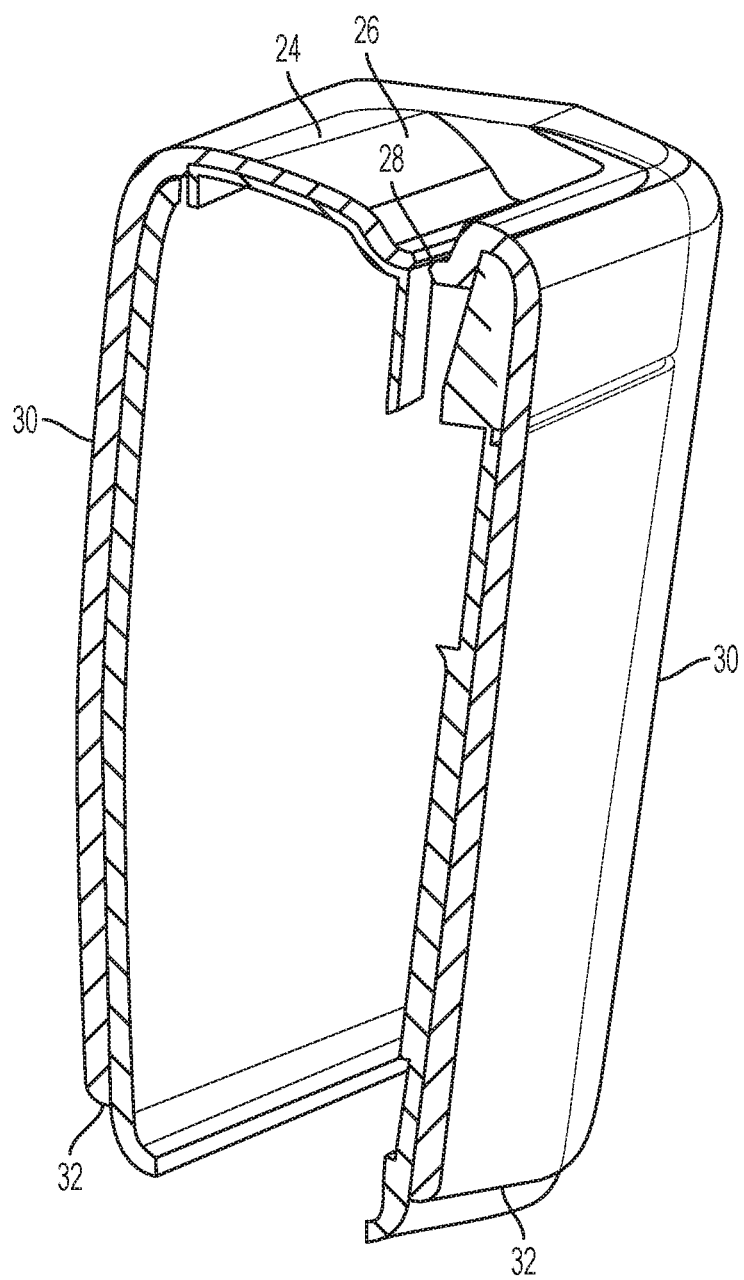
FIG. 4 is a cutaway view of another embodiment of cover device according to an aspect of the present disclosure.

Four walls 30 extend backwards along the periphery of first end 24. As can be seen, each wall 30 covers a corresponding section of housing 12 and, in conjunction, the walls 30 form a second open end 32 located on the lower side of device 22. Second end 32 is moreover adapted to receive housing 12 in a slidably insertable manner. In this embodiment, each wall 30, and thus device 22, covers approximately two-fifths (2/5) of housing 12 from top-to-bottom. However, with reference to FIG. 4, other embodiments of device 22 can cover approximately the entire top-to-bottom length of housing 12.

Referring to FIGS. 5A and 5B, slot 28 includes similar first and second flanges 34 and 36. As shown, these flanges 34 and 36 have an overlapping relationship in which the tip 34' of first flange 34 is slightly offset from and extends beyond the plane of the tip 36' of second flange 36. This relationship, in effect, causes the flanges 34 and 36 to form a foreign object and fluid resistant seal when they are positioned at rest. However, upon passage of tongue 20 through the slot 28, a portion of the first and second flanges 34 and 36 may bend inwardly (i.e., towards opening 16) to create a temporary gap 38 while tongue 20 is inserted into slot 28. Spring force of tips 34' and 36' causes gap 38 to conform to the periphery shape of tongue 20 and causes the tips to forcibly abut against the sides of tongue 18. This behavior ensures a seal remains formed around tongue 20 throughout its insertion into opening 16. To ensure such bending occurs and proper flexibility, the tips of flanges 34 and 36 may have a substantially thinner construction than the rest of device 22; for example, the flange tips may be a half millimeter (0.5 mm) in thickness whereas the rest of device 22 is approximately two millimeters (2 mm) in thickness.

Application of the cover device 22 to removably seal the seatbelt-tongue-reception end 14 of a preassembled buckle 10 can be simple and quick. The vehicle owner/user should first ensure seatbelt buckle 10 is unobstructed and has a substantially upward facing orientation. The owner/user should then slide cover device 22 over the buckle 10. In doing so, the second end 30 should first receive the seatbelt-tongue-reception end 14. Device 22 should then be pressed unto buckle 10 until the backside of the first end 24 slides against and consequently abuts the seatbelt-tongue-reception end 14 of buckle 10. The owner/user should moreover ensure slot 28 functionally aligns with opening 16 so that tongue 30 can properly enter opening 16 while cover device 22 is on buckle 10. Suction pressure should then cause cover device 22 to remain on buckle 10 throughout its general usage.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A cover device adapted to removably cover a portion of a seatbelt buckle, the cover device being constructed of a flexible material, the cover device comprising:
    a first closed end;
    a slot formed along a portion of the first closed end, the slot adapted to allow the passage of a seatbelt tongue and resist the passage of other objects or fluids;
    a second open end adapted to receive a seatbelt buckle housing; and
    wherein the first closed end comprises a first flange and a second flange being in an overlapping relationship to define the slot, wherein the first and second flanges are each adapted to bend during the passage of the seatbelt tongue so as to create a temporary gap which substantially conforms to the seatbelt tongue periphery.

2. The cover device of claim 1, further comprising a plurality of walls located between the first closed end and second open end, wherein each wall is configured to cover a portion of a corresponding section of the seatbelt buckle housing.

3. The cover device of claim 1, wherein the slot is formed along a tapered portion of the first closed end, the tapered portion adapted to guide the seatbelt tongue to pass through the slot.

4. The cover device of claim 1, wherein the cover device is constructed in a substantially rectangular configuration.

5. The cover device of claim 1, wherein the cover device is adapted to sealably cover the seatbelt-tongue-reception end and side wall sections of the seatbelt buckle housing.

6. The cover device of claim 1, wherein the flexible material is rubber.

7. The cover device of claim 1, wherein the flexible material is a lightweight plastic or thermoplastic elastomer.

8. The cover device of claim 1, wherein the flexible material is phosphorescent.

9. A cover device adapted to removably seal a seatbelt-tongue-reception end of a seatbelt buckle housing, the cover device being constructed of a flexible material and having a substantially rectangular construction, the cover device comprising:
    a first closed end comprising:
        a first flange and a second flange being in an overlapping relationship to define a sealable slot, wherein the first and second flanges are each adapted to bend during the passage of a seatbelt tongue so as to create a temporary gap which substantially conforms to the seatbelt tongue periphery shape and abuts the seatbelt tongue sides; and
        a tapered portion adapted to guide the seatbelt tongue to pass through the sealable slot;
    a second open end adapted to receive a seatbelt buckle housing; and
    a plurality of walls located between the first closed end and second open end, wherein each wall is configured to cover a portion of a corresponding section of the seatbelt buckle housing.

10. The cover device of claim 9, wherein the flexible material is lightweight plastic.

11. The cover device of claim 9, wherein the flexible material is a thermoplastic elastomer.

12. The cover device of claim 9, wherein the flexible material is phosphorescent.

13. A method of applying a cover device to removably seal the seatbelt-tongue-reception end of a seatbelt buckle housing, the method comprising:
    providing a seatbelt buckle having a housing with a seatbelt-tongue-reception end;
    providing a cover device, comprising:
        a first closed end, wherein the first closed end comprises a first flange and a second flange being in an overlapping relationship to define the slot, wherein the first and second flanges are each adapted to bend during the passage of the seatbelt tongue so as to create a temporary gap which substantially conforms to the seatbelt tongue periphery;
        a slot formed along a portion of the first closed end, the slot adapted to allow the passage of a seatbelt tongue and resist the passage of other objects or fluids; and
        a second open end adapted to receive a seatbelt buckle housing;
    sliding the cover device over the seatbelt buckle housing such that the second open end receives the seatbelt buckle housing; and
    allowing the slot to functionally align with a seatbelt-tongue-reception opening through a portion of the seatbelt buckle housing.

14. The method of claim 13, further comprising allowing a seatbelt tongue to pass through the slot so as to enter the seatbelt-tongue-reception opening.

15. The method of claim 13, wherein the cover device further comprises a plurality of walls located between the first closed end and second open end, wherein each wall is configured to cover a portion of a corresponding section of the seatbelt buckle housing.

16. The method of claim 13, wherein the slot is formed along a tapered portion of the first closed end, the tapered portion adapted to guide the seatbelt tongue to pass through the slot.

17. The method of claim 13, wherein the cover device is adapted to fully cover the first end and side walls of the seatbelt buckle housing.

18. The method of claim 13, wherein the cover device is constructed from a lightweight plastic.

\* \* \* \* \*